Oct. 21, 1969  R. B. GREENLY ET AL  3,473,451
FILM ANNOTATION METHOD AND APPARATUS
Filed Sept. 17, 1965  2 Sheets-Sheet 1

INVENTORS
ROBERT B. GREENLY
KURT W. JENKNER
RAYMOND E. KITTREDGE
BY Jack Larsen
ATTORNEY

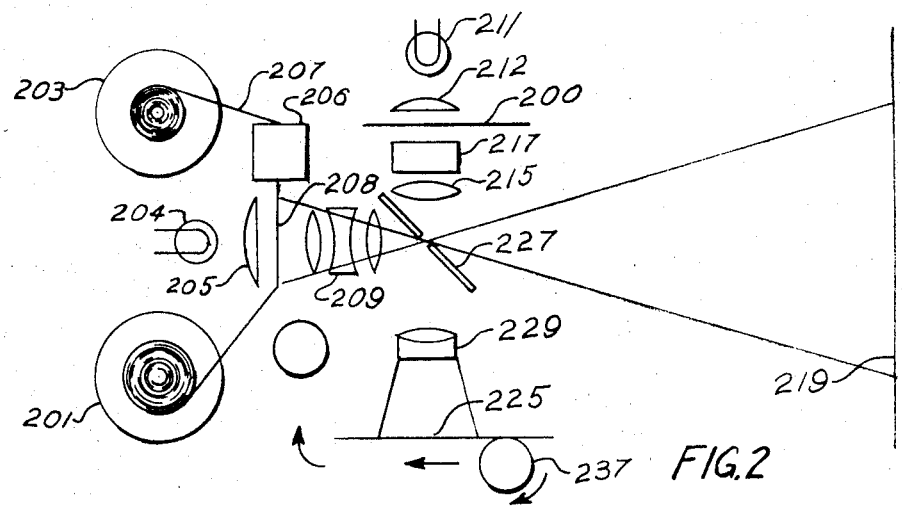
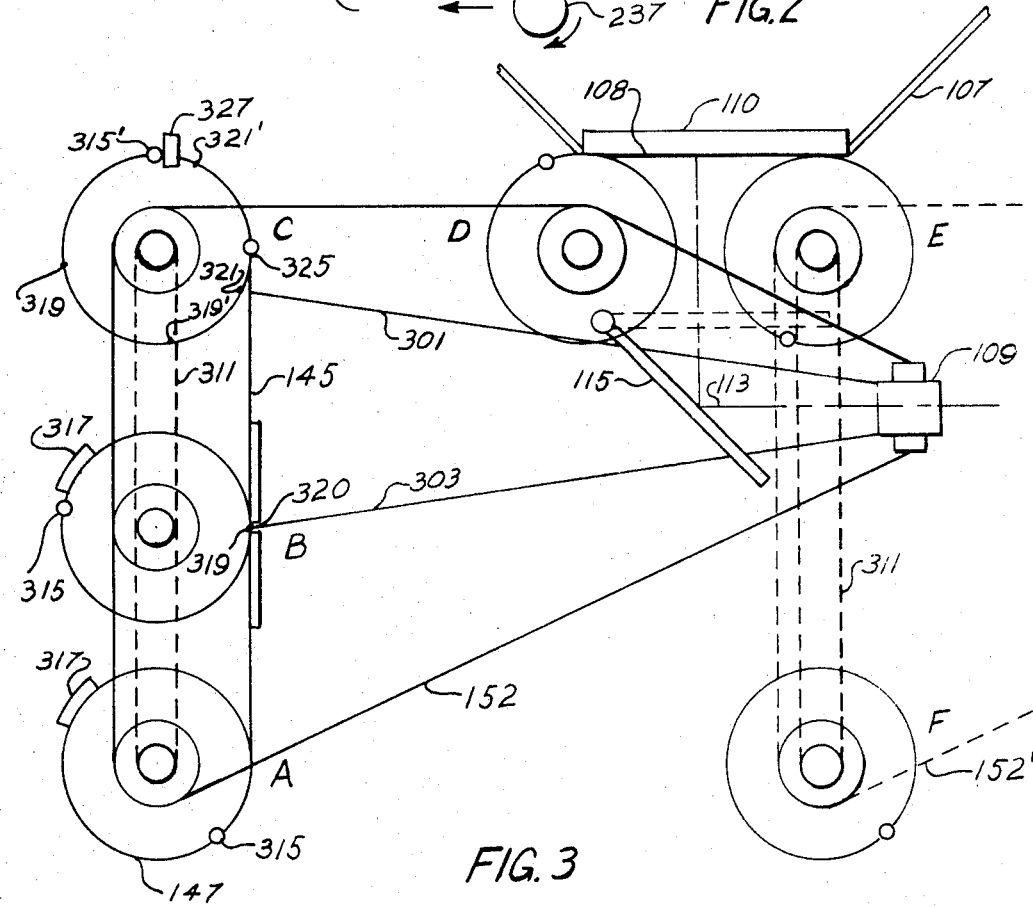

United States Patent Office 3,473,451
Patented Oct. 21, 1969

3,473,451
FILM ANNOTATION METHOD AND APPARATUS
Robert B. Greenly, Endicott, Kurt W. Jenkner, Vestal, and Raymond E. Kittredge, Chenango Bridge, N.Y., assignors to Singer-General Precision Inc., Binghamton, N.Y., a corporation of Delaware
Filed Sept. 17, 1965, Ser. No. 488,020
Int. Cl. G03b *17/04, 27/52*
U.S. Cl. 95—1.1
12 Claims

ABSTRACT OF THE DISCLOSURE

The disclosed embodiments of the present invention are a method of and apparatus for annotating frames of a processed film strip. The film image is projected onto a screen which can be marked with an appropriate annotation. An electrophotographic copy of the annotation is made and transferred onto the film in registry with the frame. One disclosed apparatus is formed of a film projector, a screen, and a pivotally mounted mirror which projects the film image from the projector onto the screen in one position thereof. After the mirror is rotated to a second position, an annotation placed on the screen is illuminated and projected onto an electrostatic copy forming drum and the resulting copy is transferred to the film. Another disclosed embodiment is formed of a film projector and an annotation projector which superpose respective images onto a screen by means of a beam splitting mirror. The annotation projector is adjustable to position an annotation at a desired location on the film image. The annotation image is projected onto an electrostatic copy forming drum and transferred to the film in registry with the frame thereon.

Figure 1:
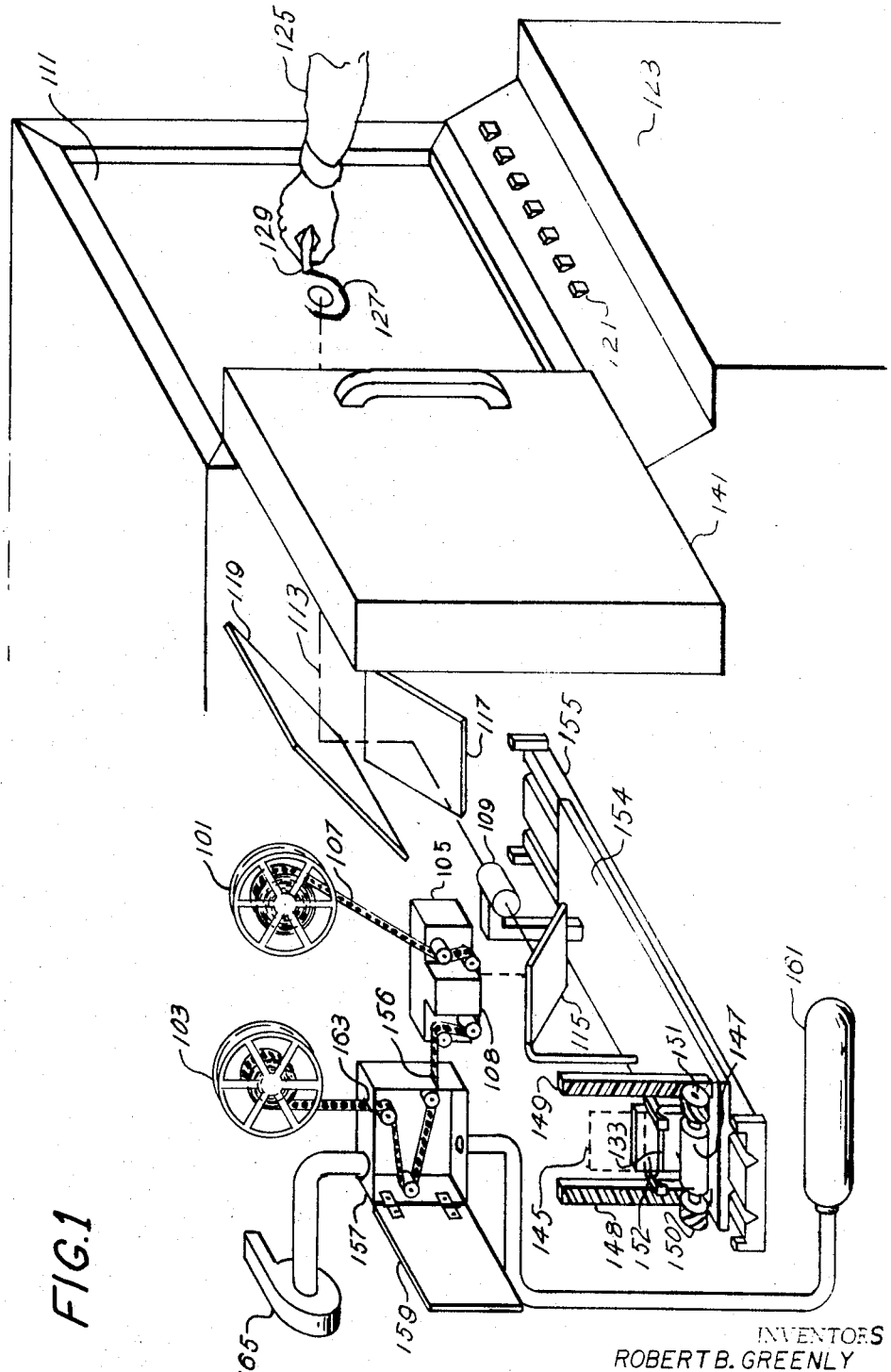

This invention relates to photography and more particularly to a method and apparatus for annotation on processed photographic film.

Photographic film, particularly motion picture film, is used for many record purposes. After development and further processing, the film is viewed for editing, interpretion, analysis etc. During such review it is advantageous to make annotations on particular frames or portions of frames for further reference. For some purposes it is desirable that these markings be erasable without damage to the film and that they may be applied by remote control during an on-line projection viewing process. Prior art annotating methods which make permanent markings on the film include devices for punching holes, stamping with a hot die, or chemically etching the film. Alternative processes which avoid damage to the original film require photocopying of the film with annotations added in the process.

It is an object of the present invention to provide means for annotating a processed film in such a way that the markings subsequently can be removed. A further object of the invention is to provide improved annotating equipment whereby the annotations may be applied in contrasting colors. A still further object of the invention is to provide means for annotation which have no effect on gelatin, silver grain or base material of all films presently in use, and which will not scratch or otherwise damage the original film. A still further object is to provide annotating means which permit maximum utilization of a single optical system for both film viewing and photorecording of annotations. Yet another object of the invention is to provide a film annotating means having high resolution to permit detailed and compact annotation.

A feature of the invention is the use of an electrophotographic process commonly known as xerography to record the annotations on the film. It is a feature of the present invention that the annotations may be applied by an operator to an image projected from the film through a lens system and registry between the annotations and the film is effected by reciprocal use of the same lens system, the lens serving as a projector lens for the film and as a camera lens for the annotations. A further feature is that the xerographic process is one which is wholly compatible with photographic film and one whereby annotations may be applied either to the base or emulsion side of the film.

Other objects and features of the invention will be pointed out in the following description and claims and illustrated in the accompanying drawings which disclose by ways of example the principles of the invention and of the best mode which has been contemplated for applying those principles. In the drawings:

FIG. 1 is a partially schematic and cut-away isometric illustration of the preferred embodiment of the invention, FIG. 2 is a simplified schematic diagram showing an alternative arrangement of apparatus of the invention, and FIG. 3 is a schematic representation of the electrostatic offset mechanism for the embodiment of FIG. 1.

In the process of electro-photography or xerography, a plate or drum of aluminum having a surface coating of amorphus selenium is given a uniform surface charge of positive electricity. Upon subsequent exposure to light the surface gives up its charge at a rate proportional to the amount of light impinging. An image of the matter to be reproduced is formed on the selenium surface; since upon exposure, the dark areas of the image retain their electrostatic charge while the illuminated portions are discharged. Thus the latent photographic image in the first instance is defined by the distribution of electric charge on the selenium surface. This image is rendered visible by dusting the plate or drum with a negatively charged powder termed a "toner," which may be either black or of any desired color. The dust clings to the low charge regions while being repelled from areas of high charge density. The image may be rendered permanent by transferring and fixing on the surface of a suitable material. Transfer may be facilitated by a charged electrode behind the material to be annoted such as film or paper. The toner which usually consists of dyed thermoplastic powder such as polystyrene is fixed and fused to the annotation surface by application of heat or chemical dissolving action.

FIG. 1 shows a general representation of apparatus of the invention. Shown are a film supply reel 101, a film take-up spool 103, a projection unit 105 by which the images on the film 107 are projected from the film gate 108 through a lens 109 onto a composing screen 111. The optical path represented by the optical axis 113 is bent by mirrors 115, 117 and 119. Such mirrors are typical of viewers and permits fitting a practical projection distance into a cabinet of restricted size. Projection of images from the film gate 108 onto the screen 111 is controlled by an operator using controls 121 on the console 123. An operator 125 can stop the projection at any frame and make an annotation 127 using a marker 129. The annotation is recorded on the film by the following steps:

*First,* the operator slides the light box 141 in position covering the screen 111. The projection lamp is shuttered; and the mirror 115 is hinged out of the way. The box 141 illuminates the screen 111 from the front (operator's side of the screen), projecting the image of the annotation 27 onto the image plane 145.

*Second,* a latent electrostatic image copy of the annotation 127 is formed on the drum 147. The drum is constrained by racks 148 and 149 and pinions 150 and 151 to roll on the image plane 145 and a focal plane shutter 152 and slit 133 move with the line of tangency of the drum 147 to the plane 145.

*Third,* a negatively charged toner is then applied to the drum, adhering to the dark portions of the copy.

*Fourth,* the drum is carried forward together with racks 148 and 149, mirror 115 and lens 109 by the frame 154 and the slide 155. The top of the drum 147 is tangentially related to the film 107 in the gate 108 and rolls across the film frame. The dry powder image is transferred from drum to film by a strong positive charge applied to the reverse side of the film.

At the completion of the transfer process the drum is brushed clean, recharged and returned to the starting point. The result may be checked immediately by re-projection of the image. It will be apparent that with the apparatus, as just described, any annotation which the operator can draw with his marker may be applied to the film. Any color of toner may be used. The film may be run through the process a second time to apply a second color of annotations using a new batch of toner. The operator may also stick reusable precut standards symbols such as arrows, cross-hairs or such to the screen.

The markings must be fixed before the temporary binding electrostatic charge is dissipated. As the film passes from the film gate 108 it passes through a slot 156 into the fixing chamber 157 shown with the door 159 open. In this chamber the film is exposed to solvent vapor from a source 161. To prevent escape of fumes through the slot 156 and the outlet slot 163, the chamber is connected to an exhaust fan 165. The vapor renders the toner soft, sticky and adherent to the film.

FIG. 2 represents an alternative arrangement whereby a predetermined repertory of annotation symbols on a turret transparency 200 may be recorded. The apparatus in many ways is similar to that of FIG. 1. There is a film supply spool 201, a take-up spool 203, a projection lamp 204, a condensing lens 205, developing chamber 206, film 207 and film gate 208. In this embodiment the projection objective 209 is used only one way. A second projection lamp 211 and condensing lens 212 illuminate a selected symbol on the transparency turret 200. The image of the selected symbol is projected by a second projection lens 215 and a translation device 217 and is imaged simultaneously on the screen 219 and in the image plane 225 of the xerographic apparatus. For this the semi-silvered beam-splitting mirror 227 and the lens 229 are required. As in the embodiment of FIG. 1 the annotations are formed as latent images on the selenium drum 237 and by xerographic process developed and transferred to the surface of the film 207 in the film gate 208. The translating device 217 represents symbolically any one of the various mechanisms well known in the art by which the basic symbol on the transparency may be transformed in size, position and orientation relative to its image on the screen 219 and in the image plane 225. The device 217 is controlled by the operator to superpose the desired annotation on the viewed image of the film.

FIG. 3 is a schematic representation of the electrostatic transfer portion of the embodiment shown in FIG. 1 and especially the kinematics of the mechanism. Shown at the top of the figure are the film 107, film gate 108, objective lens 109, the optical axis 113 and the mirror 115 which form part of the optical path in the projection mode. The mirror 115 is also shown dotted in its position swung out of the way for the electrostatic recording of images in the image plane 145 on the drum 147. The frame 152 which supports the drum 147, the mirror 115, and the lens 109, is shown in structural detail different from FIG. 1. The outline 152 at the left of the figure indicates its position at the start of the xerographic cycle. The dotted outline 152' at the right of the figure indicates the position at the end of the xerographic cycle. In addition to the racks 148 and 149 (not shown) the drum 147 is constrained by a slot 311. Successive positions of the drum 147 in the xerographic cycle are indicated by the letters A, B, C, D, E and F respectively. Rotation of the drum 147 is controlled by the pinions 148 and 149 and also by an index 315. The pitch diameter of the pinion gears is exactly the drum diameter.

At the start of the cycle the mirror 115 is raised, the light box 141 (FIG. 1) illuminates the annotations and the drum 147 rises, rotating clockwise. Charging potential is applied to the electrode 317 which is carried upward with the drum. At the position 319 when it reaches the lower limit 303 of the image the drum is fully charged for the start of recording. The projected image of the annotation is limited by the focal-plane shutter slit 320 which rises with the drum so that only the apparently motionless tangent point of the drum is exposed. As the drum continues to roll upwards, the latent electrostatic image is applied between the position 319 marking the start of the image and the position 321 marking the upper limit thereof. Clockwise rolling under the restraint of the racks 148 and 149 continues until the index 315 reaches the image plane at the position 325 at which point the vertical translation ceases and the drum is released to rotate clockwise 270 degrees to the stop 327. During this rotation, plastic coated glass beads carrying toner dust are cascaded over the latent image rendering it visible and reproducible. The positions of the beginning 319 and end 321 respectively of the latent image on the arrival of the drum at positions C are as designated. The positions 319' and 321' mark respectively the beginning and end of the developed image just as the drum leaves position C. From position C, the drum is carried forward along the optical axis together with the frame 152 and the parts attached to it. In position D the drum again engages racks and begins to roll in tangent contact with the film 107 in the film gate 108. Rolling from position D to position E the image is attracted to the transparent conducting glass electrode 110 which carries a high positive charge by which the dust is transferred from the drum 147 to the film 107. From position E the drum drops to position F, is cleaned of any residual toner whence the frame 152 returns it to the starting point at position A.

Since a very wide variety of substances will carry an electrostatic charge, great flexibility is available in the selection of toner and fixing means. In particular a toner may be selected which may be removed by a solvent which is not harmful to the film or emulsion, and in this way the annotations overprinted on the film by the apparatus and method of the invention may be removed as desired. To prevent the accumulation within the mechanism of undesirable residues, appropriate exhaust and waste disposal means must be provided.

It should be pointed out that the apparatus described above as embodying the present invention is general in nature and capable of execution by a designer with many variations particularly as to the number and arrangement of the parts as shown in the figures without departing from the spirit of the invention as defined by the appended claims.

The embodiments of the invention in which an exclusive property or privilege is claimed are defined as follows:

1. The method of annotating frames of a processed film strip comprising the steps of:
   (A) projecting the film image of a frame of said strip on a screen through a lens system,
   (B) marking said screen with an appropriate annotation,
   (C) making an electrophotographic copy of said annotation through said lens system, and
   (D) transferring said copy onto said film in registry with said frame.

2. The method of annotating processed film comprising the steps of:
(A) projecting a film image on a screen,
(B) marking said screen with an appropriate annotation,
(C) making an electrophotographic copy of said annotation, and
(D) transferring said copy onto said film.

3. The method of annotating a processed film comprising the steps of:
(A) superposing an appropriate annotation on a viewed image of said film,
(B) making an electrophotographic copy of said annotation, and
(C) transferring said copy onto said film in registry with said image.

4. The method of annotating frames of a processed film strip comprising the steps of:
(A) projecting the film image of a frame of said strip on a screen through a lens system,
(B) superposing an appropriate annotation said image,
(C) making an electrophotographic copy of said annotation through said lens system, and
(D) transferring said copy onto said film in registry with said frame.

5. The method of annotating frames of a processed film strip comprising the steps of:
(A) projecting the film image of a frame of said strip on a screen through a lens system,
(B) superposing on said image an appropriate annotation,
(C) making an electrophotographic copy of said annotation on a selenium surface,
(D) dusting a toner over said surface, and
(E) transferring said copy onto said film in registry with said frame.

6. The method of annotating frames of a processed film comprising the steps of:
(A) from behind a translucent screen projecting the film image of a frame of said strip on said screen through a lens system,
(B) marking said screen with an appropriate annotation,
(C) illuminating said annotation from the front of said screen,
(D) making an electrophotographic image of said illuminated annotation through said lens system, and
(E) transferring said annotation image onto said film in registry with said frame.

7. For annotating processed photographic film the combination comprising:
(A) a viewer having a lens system for projecting from behind, the image of a scene from said film, onto a screen,
(B) means for making annotation on the front of said screen,
(C) electrophotographic means including said lens system for forming an image of said annotation on a drum, and
(D) means for transporting said drum into printing contact with said film.

8. For annotating processed photographic film the combination comprising:
(A) a viewer having a lens system for projecting the image of a scene from said film on a screen,
(B) projection means for superposing the image of an annotation with said scene image on said screen,
(C) electrophotographic means for forming a copy of said annotation on a surface, and
(D) means for transferring said copy to said film in registry with said scene.

9. For annotating processed photographic film the combination comprising:
(A) a viewer having a lens system for projecting the image of a scene from a frame of said film in a film gate in a first object plane of said system onto a screen in the correlative first image plane,
(B) means for making an annotation on said screen,
(C) means for projecting backwards through said lens system said annotation lying in said image plane, reciprocally regarded as a second object plane for which the correlative second image plane is closely related to said film gate,
(D) a moveable mirror for relating said second image plane to said first object plane,
(E) electrophotographic means including said lens system for forming a copy of said annotation in said second image plane, and
(F) means for transferring said copy from said second image plane to said film in said first object plane.

10. For annotating processed photographic film the combination comprising:
(A) a viewer having a lens system for projecting the image of a scene from said film onto a screen, comprising:
 (i) a film gate defining an object plane,
 (ii) a projection lens system, and
 (iii) a mirror forming a 45 degree dihedral angle with said object plane,
(B) means for making annotation on said screen,
(C) electrophotographic means including said lens system for making a copy of said annotation on a surface in an image plane forming a right angle to said object plane, said right angle being bisected by the plane of said mirror, and
(D) means for transferring said copy from said surface to said film comprising:
 (i) means for translating parallel to the image plane, and
 (ii) means for translating parallel to said object plane.

11. A combination as defined in claim 8, further comprising means for positioning said annotation image with respect to said scene image on said screen.

12. A combination as defined in claim 8, further comprising means for positioning said annotation image with respect to said scene image on said screen and simultaneously positioning said annotation with respect to the surface of said electrophotographic means.

References Cited

UNITED STATES PATENTS 2,692,529 10/1954 Halahan.
3,120,790 2/1964 Carlson _____ 95—1.7
2,938,201 5/1960 Thornton _____ 95—1.1 X JOHN M. HORAN, Primary Examiner U.S. Cl. X.R.
355—40